US009743678B1

(12) United States Patent
Jones et al.

(10) Patent No.: US 9,743,678 B1
(45) Date of Patent: Aug. 29, 2017

(54) STUNNER

(71) Applicant: Jarvis Products Corporation, Middletown, CT (US)

(72) Inventors: Arthur Jones, Tabor, IA (US); Trent Jones, Tabor, IA (US)

(73) Assignee: Jarvis Products Corporation, Middletown, CT (US)

( * ) Notice: Subject to any disclaimer, the term of this patent is extended or adjusted under 35 U.S.C. 154(b) by 0 days.

(21) Appl. No.: 15/254,546

(22) Filed: Sep. 1, 2016

Related U.S. Application Data

(60) Provisional application No. 62/357,566, filed on Jul. 1, 2016.

(51) Int. Cl.
*A22B 3/00* (2006.01)
*A22B 3/02* (2006.01)

(52) U.S. Cl.
CPC ...................... *A22B 3/02* (2013.01)

(58) Field of Classification Search
CPC .................................. A22B 3/00; A22B 3/02
USPC ............................................. 452/57, 61, 62
See application file for complete search history.

(56) References Cited

U.S. PATENT DOCUMENTS

| | | | | |
|---|---|---|---|---|
| 4,219,905 A * | 9/1980 | Thacker | ................... | A22B 3/02 452/57 |
| 4,446,599 A * | 5/1984 | Karubian | ................ | A22B 3/02 452/62 |
| 4,503,585 A * | 3/1985 | Hamel | ..................... | A22B 3/02 227/130 |
| 4,575,900 A * | 3/1986 | Hamel | ..................... | A22B 3/02 227/130 |
| 4,625,442 A * | 12/1986 | Hill | .......................... | A22B 3/02 227/10 |
| 4,757,627 A * | 7/1988 | Saligari | .................... | A22B 3/02 42/1.12 |
| 5,692,951 A * | 12/1997 | Huff | ........................ | A22B 3/02 452/57 |
| 6,170,477 B1 * | 1/2001 | Horlock | ................. | F41B 11/83 124/61 |

* cited by examiner

*Primary Examiner* — Richard Price, Jr.
(74) *Attorney, Agent, or Firm* — DeLio, Peterson & Curcio, LLC; Peter W. Peterson

(57) ABSTRACT

A pneumatic stunner for stunning an animal has a piston slideable within an inner chamber, and a stunning rod driven by the piston forward and rearward towards and away from the front end of the housing. A fire pressure chamber has an annular configuration disposed adjacent the rearward or central end of the inner chamber. A return pressure chamber has an annular configuration disposed adjacent the forward or central end of the inner chamber. A valve system alternately controls flow of the pressurized fluid from the fire pressure chamber to the rearward end of the inner chamber to move the piston and drive the stunning rod forward to stun an animal, and from the return pressure chamber to the forward end of the inner chamber to move the piston and drive the stunning rod rearward and retract the stunning rod. The handle includes a cushioned mount adjustable in direction.

11 Claims, 15 Drawing Sheets

STUNNER

This application claims priority to U.S. provisional patent application No. 62/357,566 filed on Jul. 1, 2016 and U.S. non-provisional patent application Ser. No. 15/211,524 filed on Jul. 15, 2016

BACKGROUND OF THE INVENTION

1. Field of the Invention

This invention relates in general to a pneumatic animal stunner for use in livestock/slaughterhouse operations and more specifically to the catch system for holding and releasing the stunning rod, the compressed air supply used to retract the stunning rod between operation cycles, and the handles used by the operator to hold the stunner.

2. Description of Related Art

In livestock production plants, it is important to stun and disable an animal for processing. Although numerous methods have been used to stun livestock, captive bolt mechanisms have proven to be the most efficient, inexpensive, and humane way to disable the animal. Particularly, pneumatic captive bolt devices have been used in this capacity.

U.S. Pat. No. 6,135,871 and U.S. Patent Publication No. 2004/0209562, the disclosures of which are hereby incorporated by reference, disclose pneumatic animal stunners that, among other things, include a physical catch for the piston that drives the stunning rod.

FIGS. 1 and 2 show a prior art catch arrangement for a stunner in which stunning rod 1 extending rightward (forward) from a piston 2 has a leftward (rearward) end with outwardly extending lips 3 that may be alternately held and released by inward extending lips at the end portion 4a of a catch 4. At a central portion of the body of catch 4 is an inwardly extending flange 4b which is pivotable about an outwardly extending flange 6a of catch pivot post 6. A catch piston 5 includes an inner bore 5a at a forward end, an inner bore 5c at a rearward end, and a relief portion 5b between the two. In the hold position of FIG. 1, the catch piston 5 is slid longitudinally rearward so that forward inner bore 5a contacts moves catch forward end 4a toward and into engagement with stunning rod lips 3, at the same time that rearward inner bore 5c contacts the outer surface of catch rearward end 4c. In the release position of FIG. 2, the catch piston 5 is slid longitudinally forward so that forward inner bore 5a moves forward of catch forward end 4a, and the relief portion 5b permits catch forward end 4a to move outward and out of engagement with stunning rod lips 3 as the flange 4b of catch 4 pivots about catch post pivot flange 6a. At the same time, catch piston rearward inner bore 5c slides forward and then moves out of contact with the outer surface of catch rearward end 4c. Upon release of the stunning rod lips, compressed air behind piston 2 moves stunning rod 1 forward to stun the animal.

The catch and other components of such prior designs function well, but in operation some of its components are subject to sliding engagement with other components, and therefore interference and/or wear, which causes drag and/or requires periodic replacement of such components.

Compressed air usage by prior art stunners is also an issue, since excess air volume needed for each stunner cycle increases costs of operation. Additionally, the operator is subject to fatigue when using the stunner repeatedly, due to the shock of the stunning rod projection and retraction in each operation cycle.

SUMMARY OF THE INVENTION

Bearing in mind the problems and deficiencies of the prior art, it is therefore an object of the present invention to provide an animal stunner having a release system which reduces wear of the moving parts controlling the operation of the animal stunner.

It is another object of the present invention to provide an animal stunner having reduced drag on movement between the catch and catch piston during operation.

A further object of the invention is to provide an animal stunner having reduced wear on the catch and catch piston as a result of repeated operation and reduced premature failure.

It is yet another object of the present invention to provide an animal stunner having more reliable stunning due to a stronger and improved catch system.

Yet a further object of the present invention is to provide an animal stunner having improved operator safety as a result of a stronger catch system.

Another object of the present invention is to provide an animal stunner having lower compressed air usage between each stunner cycle.

A further object of the invention is to provide an animal stunner having improved operator comfort and reduction of possible injury.

Still other objects and advantages of the invention will in part be obvious and will in part be apparent from the specification.

The above and other objects, which will be apparent to those skilled in the art, are achieved in the present invention which is directed to a pneumatic animal stunner for stunning an animal comprising a housing having a front end, an inner chamber in the housing having a forward end and a rearward end, a piston slideable within the inner chamber, and a stunning rod within the housing and capable of being driven by the piston forward and rearward towards and away from the front end of the housing. A first pressure chamber is disposed adjacent the inner chamber. The first pressure chamber is in communication with the rearward end of the inner chamber, and the first pressure chamber supplies a pressurized fluid rearward of the piston. A second pressure chamber is disposed adjacent the inner chamber. The second pressure chamber is in communication with the forward end of the inner chamber, and the second pressure chamber supplies a pressurized fluid forward of the piston. The stunner may further include a valve system to alternately control flow of the pressurized fluid from the first pressure chamber to the rearward end of the inner chamber to move the piston and drive the stunning rod forward to stun an animal, and from the second pressure chamber to the forward end of the inner chamber to move the piston and drive the stunning rod rearward and retract the stunning rod.

The second pressure chamber may be outward of and surround the inner chamber, and may be of annular cylindrical configuration. The second pressure chamber may be smaller than the first pressure chamber.

The first pressure chamber may be outward of and surround the inner chamber adjacent a central portion or rearward end of the inner chamber, and the second pressure chamber may be outward of and surround the inner chamber adjacent a central portion or forward end of the inner chamber.

The valve system may comprise a valve body with a plurality of passageways. The valve body additionally controls flow of the pressurized fluid to the first and second pressure chambers to fill the first and second pressure chambers with pressurized fluid prior to supplying the pressurized fluid rearward of the piston to move the piston and drive the stunning rod forward.

In a related aspect, the present invention is directed to a method of stunning an animal comprising providing a pneumatic animal stunner having a housing with a front end, an inner chamber in the housing having a forward end and a rearward end, a piston slideable within the inner chamber, and a stunning rod within the housing capable of being driven by the piston forward and rearward towards and away from the front end of the housing. The stunner includes a first pressure chamber adjacent the inner chamber, with the first pressure chamber being in communication with the rearward end of the inner chamber, and a second pressure chamber adjacent the inner chamber, with the second pressure chamber being in communication with the forward end of the inner chamber. The stunner also includes a valve system to alternately control flow of the pressurized fluid from the first pressure chamber to the rearward end of the inner chamber, and from the second pressure chamber to the forward end of the inner chamber. The method includes supplying a pressurized fluid to the first pressure chamber, and supplying a pressurized fluid to the second pressure chamber. The method further includes then supplying the pressurized fluid from the first pressure chamber to the rearward end of the inner chamber to move the piston and drive the stunning rod forward, to stun an animal, and subsequently supplying the pressurized fluid from the second pressure chamber to the forward end of the inner chamber to move the piston and drive the stunning rod rearward, and retract the stunning rod. The pressurized fluid may be supplied to the first pressure chamber and to the second pressure chamber simultaneously.

The method may include providing a valve system to alternately control flow of the pressurized fluid from the first pressure chamber to the rearward end of the inner chamber, and from the second pressure chamber to the forward end of the inner chamber. The method may further include operating the valve system to control flow of the pressurized fluid from the first pressure chamber to the rearward end of the inner chamber and subsequently from the second pressure chamber to the forward end of the inner chamber.

The valve system may additionally control flow of the pressurized fluid to the first and second pressure chambers to fill the first and second pressure chambers with pressurized fluid simultaneously, prior to supplying the pressurized fluid rearward of the piston to move the piston and drive the stunning rod forward. The second pressure chamber may contain less pressurized fluid than the first pressure chamber.

The present invention is directed in another aspect to a pneumatic animal stunner for stunning an animal comprising a housing having a stunning rod therein capable of being driven along a longitudinal axis forward to stun an animal and rearward to retract the stunning rod, a handle having a valve trigger to control flow of pressurized fluid to drive forward and retract the stunning rod, and a mount between the handle and the housing. The mount has a first portion connected to the housing, a second portion connected to the handle, and at least one cushion disposed between the first and second portions. The mount acts to absorb vibration and shock transmitted from the housing to the handle.

The handle may include a valve controlled by the valve trigger. The mount first portion may contain at least one passageway for flowing pressurized air connected to the housing and the mount second portion may contain at least one passageway for flowing pressurized air connected to the handle valve. The at least one passageway of the mount first and second portions may be connected to permit pressurized air to flow between the housing and the handle valve. There may be included a plurality of passageways within each of the mount first and second portions, and a plurality of hoses connecting the passageways of the mount first and second portions. At least one fastener may extend through the at least one cushion securing the mount first portion to the mount second portion.

One of the mount first and second portions may have a central flange and the other of the mount first and second portions may have a pair of side flanges, and there may be included a cushion disposed between the central flange and the each of the side flanges and at least one fastener extending through the cushions and into the flanges to secure the mount first portion to the mount second portion. The mount may be securable to the housing to orient the handle in a fixed position wherein movement of the trigger is in a direction normal to the longitudinal axis. There may be further included an auxiliary handle on the housing having a cushion to absorb vibration and shock transmitted from the housing to the auxiliary handle.

The present invention is further directed to a pneumatic animal stunner for stunning an animal comprising a housing having a stunning rod therein capable of being driven along a longitudinal axis forward to stun an animal and rearward to retract the stunning rod, a handle having a valve and a moveable valve trigger to control flow of pressurized fluid to drive forward and retract the stunning rod, and a mount between the handle and the housing. The mount may have at least one passageway for flowing pressurized air between the housing and the handle valve. The mount is securable to the housing to orient the handle in a fixed position wherein movement of the trigger is in a direction other than the longitudinal axis. For example, the mount may orient the direction of handle trigger movement normal to the longitudinal axis.

In a further aspect the present invention is directed to a pneumatic animal stunner for stunning an animal comprising a housing having a front end, and a stunning rod within the housing and capable of being driven forward along a longitudinal axis towards the front end of the housing. A catch is mounted within the housing for alternately holding and releasing the stunning rod. The catch has a body portion pivotally mounted on a catch pivot disposed on a side away from the stunning rod longitudinal axis and an end portion extending from the body portion toward the housing front end and distal from the catch pivot. The catch end portion is movable between a hold position toward the longitudinal axis preventing the stunning rod from being driven forward and a release position away from the stunning rod longitudinal axis permitting the stunning rod to be driven forward. A catch piston is disposed adjacent the catch end portion on a side away from the longitudinal axis. The catch piston is in sliding contact with the catch adjacent the catch end portion and out of contact with the catch body portion. The catch piston is adapted to slide in the directions of the longitudinal axis between a first position urging the catch end portion toward the stunning rod longitudinal axis in the hold position, thereby holding and preventing the stunning rod from being driven forward, and a second position permitting the catch end portion to move to the release position away from the stunning rod longitudinal axis releasing and permitting the stunning rod to be driven forward. A valve is operable to control a flow of air to cause the catch piston to move from the first position to the second position, thereby driving the stunning rod forward along the longitudinal axis to stun an animal.

The catch pivot may have a lip extending inwardly from an end of a catch pivot body. The catch body may include a flange extending outwardly away from the longitudinal axis, with the catch body flange engaging the inwardly extending catch pivot lip to permit the catch to pivot between the hold and release positions. The pneumatic animal stunner of claim 1 wherein the catch pivot may comprise a ring extending around the longitudinal axis. A plurality of catches may be arranged about the longitudinal axis, with each catch curved in an arc about the longitudinal axis, the catches pivoting on the catch pivot ring.

The present invention is also directed to a method of stunning an animal comprising providing a pneumatic animal stunner having a housing with a front end and a stunning rod within the housing and capable of being driven forward along a longitudinal axis towards the front end of the housing. The stunner includes a catch mounted within the housing for alternately holding and releasing the stunning rod. The catch has a body portion pivotally mounted on a catch pivot disposed on a side away from the stunning rod longitudinal axis and an end portion extending from the body portion toward the housing front end and distal from the catch pivot. The catch end portion is movable between a hold position toward the longitudinal axis engaging the stunning rod and a release position away from longitudinal axis disengaging the stunning rod. The stunner also includes a catch piston disposed adjacent the catch end portion on a side away from the longitudinal axis. The catch piston is adapted to slide in the directions of the longitudinal axis between positions toward and away from the housing front end, and is in sliding contact with the catch adjacent the catch end portion and out of contact with the catch body portion. The stunner further includes a valve operable to control a flow of air to cause the catch piston to move from the first position to the second position. The method includes positioning the catch piston in a first position along the longitudinal axis away from the housing front end, with the catch piston being out of contact with the catch body portion while urging the catch end portion toward the stunning rod longitudinal axis in the hold position, thereby holding and preventing the stunning rod from being driven forward. The method also includes operating the valve to cause a flow of air to move the catch piston along the longitudinal axis from the first position to a second position toward the housing front end. The catch piston in the second position is out of contact with the catch body portion while permitting the catch end portion to move to the release position away from the longitudinal axis releasing the stunning rod, thereby permitting the stunning rod to be driven forward along the longitudinal axis to stun an animal.

The method may further include, after stunning the animal, permitting the stunning rod to return to the first position wherein the catch piston is positioned along the longitudinal axis away from the housing front end. The catch piston may remain out of contact with the catch body portion while urging the catch end portion toward the stunning rod longitudinal axis in the hold position, thereby holding and preventing the stunning rod from being driven forward until the valve is operated.

The catch pivot may comprise a lip extending inwardly from an end of a catch pivot body and the catch body may include a flange extending outwardly away from the longitudinal axis, with the catch body flange engaging the inwardly extending catch pivot lip to permit the catch to pivot between the hold and release positions while the catch piston remains out of contact with the catch body portion.

The catch pivot may comprise a ring extending around the longitudinal axis, and there may be a plurality of catches arranged about the longitudinal axis, with each catch having a body portion curved in an arc about the longitudinal axis. The catches pivot on the catch pivot ring between the hold and release positions while the catch piston remains out of contact with the curved catch body portion.

In another aspect, the present invention is directed to a pneumatic animal stunner for stunning an animal comprising a housing having a front end and a stunning rod within the housing and capable of being driven forward along a longitudinal axis towards the front end of the housing. A catch is mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end. The catch has an end portion extending from the body portion toward the housing front end and distal from the catch pivot. The catch end portion is movable between a hold position toward the longitudinal axis, wherein the catch body is in contact with both the stationary catch pivot and the stationary catch support distal end, preventing the stunning rod from being driven forward, and a release position away from the stunning rod longitudinal axis, wherein the catch body is in contact with the stationary catch pivot and out of contact with the stationary catch support distal end, permitting the stunning rod to be driven forward. A catch piston is disposed adjacent the catch end portion on a side away from the longitudinal axis. The catch piston is in sliding contact with the catch adjacent the catch end portion. The catch piston is adapted to slide in the directions of the longitudinal axis between a first position urging the catch end portion toward the stunning rod longitudinal axis in the hold position, thereby holding and preventing the stunning rod from being driven forward, and a second position permitting the catch end portion to move to the release position away from the stunning rod longitudinal axis releasing and permitting the stunning rod to be driven forward. A valve is operable to control a flow of air to cause the catch piston to move from the first position to the second position, thereby driving the stunning rod forward along the longitudinal axis to stun an animal.

In a related aspect the present invention is directed to a method of stunning an animal comprising providing a pneumatic animal stunner having a housing with a front end and a stunning rod within the housing and capable of being driven forward along a longitudinal axis towards the front end of the housing. The stunner includes a catch mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end. The catch has an end portion extending from the body portion toward the housing front end and distal from the catch pivot. The catch end portion is movable between a hold position toward the longitudinal axis, and a release position away from the stunning rod longitudinal axis. The stunner also includes a catch piston disposed adjacent the catch end portion on a side away from the longitudinal axis. The catch piston is in sliding contact with the catch adjacent the catch end portion. The catch piston is adapted to slide in the directions of the longitudinal axis between positions toward and away from the housing front end; and a valve operable to control a flow of air to cause the catch piston to move from the first position to the second position. The method includes positioning the catch piston in a first position along the longitudinal axis away from the housing front end urging the catch end portion toward the stunning rod longitudinal axis in the hold position. The catch body is in contact with both the stationary catch pivot and the stationary catch support distal end, thereby holding and preventing the stunning rod from being driven forward. The catch piston is in sliding contact with the catch adjacent the catch end portion. The method further includes operating the valve to cause a flow of air to move the catch piston along the longitudinal axis from the first position to a second position toward the housing front end wherein the catch body is in contact with the stationary catch pivot and out of contact with the stationary catch support distal end. The second position permits the catch end portion to move to the release position away from the longitudinal axis releasing and permitting the stunning rod to be driven forward along the longitudinal axis to stun an animal.

The method may further include, after stunning the animal, permitting the stunning rod to return to the first position wherein the catch piston is positioned along the longitudinal axis away from the housing front end. The catch piston urges the catch end portion toward the stunning rod longitudinal axis in the hold position and the catch body into contact with the stationary catch support distal end, thereby holding and preventing the stunning rod from being driven forward until the valve is operated.

The catch pivot may comprise a lip extending inwardly from an end of a catch pivot body and the catch body may include a flange extending outwardly away from the longitudinal axis. The catch body flange engages the inwardly extending catch pivot lip to permit the catch to pivot between the hold and release positions while the catch body moves into and out of contact with the stationary catch support distal end, respectively.

The catch pivot may comprise a ring and extend around the longitudinal axis, and the stationary catch support distal end may be circular and extend around the longitudinal axis. There may be a plurality of catches arranged about the longitudinal axis, with each catch having a body portion curved in an arc about the longitudinal axis. The catches pivot on the catch pivot ring between the hold and release positions while the catch body moves into and out of contact with the stationary catch support distal end, respectively.

In a further aspect the present invention provides a pneumatic animal stunner for stunning an animal comprising a housing having a front end and a stunning rod within the housing and capable of being driven forward along a longitudinal axis towards the front end of the housing. A catch is mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end and an elastic member adjacent the catch support distal end. The catch has an end portion extending from the body portion toward the housing front end and distal from the catch pivot. The catch end portion is movable between a hold position toward the longitudinal axis, preventing the stunning rod from being driven forward, and a release position away from the stunning rod longitudinal axis, assisted by the elastic member, permitting the stunning rod to be driven forward. A catch piston is disposed adjacent the catch end portion on a side away from the longitudinal axis. The catch piston is in sliding contact with the catch adjacent the catch end portion. The catch piston is adapted to slide in the directions of the longitudinal axis between a first position urging the catch end portion toward the stunning rod longitudinal axis in the hold position, thereby holding and preventing the stunning rod from being driven forward, and a second position permitting the catch end portion to move to the release position away from the stunning rod longitudinal axis, assisted by the elastic member, releasing and permitting the stunning rod to be driven forward. A valve is operable to control a flow of air to cause the catch piston to move from the first position to the second position, thereby driving the stunning rod forward along the longitudinal axis to stun an animal.

In a further related aspect the present invention provides a method of stunning an animal comprising providing a pneumatic animal stunner having a housing with a front end and a stunning rod within the housing and capable of being driven forward along a longitudinal axis towards the front end of the housing. The stunner includes a catch mounted within the housing for alternately holding and releasing the stunning rod. The catch has a body portion pivotally mounted between a stationary catch pivot disposed on a side away from the stunning rod longitudinal axis and a stationary catch support disposed on a side toward the stunning rod longitudinal axis. The catch support has a distal end extending toward the housing front end and an elastic member adjacent the catch support distal end. The catch has an end portion extending from the body portion toward the housing front end and distal from the catch pivot. The catch end portion is movable between a hold position toward the longitudinal axis, and a release position away from the stunning rod longitudinal axis. The stunner also includes a catch piston disposed adjacent the catch end portion on a side away from the longitudinal axis. The catch piston is in sliding contact with the catch adjacent the catch end portion. The catch piston is adapted to slide in the directions of the longitudinal axis between a positions toward and away from the housing front end. The stunner further includes a valve operable to control a flow of air to cause the catch piston to move from the first position to the second position. The method includes positioning the catch piston in a first position along the longitudinal axis away from the housing front end urging the catch end portion toward the stunning rod longitudinal axis in the hold position, thereby holding and preventing the stunning rod from being driven forward. The catch piston is in sliding contact with the catch adjacent the catch end portion. The method also includes operating the valve to cause a flow of air to move the catch piston along the longitudinal axis from the first position to a second position toward the housing front end. The second position permits the catch end portion to move to the release position away from the longitudinal axis, assisted by the elastic member, releasing and permitting the stunning rod to be driven forward along the longitudinal axis to stun an animal.

The method may further include, after stunning the animal, permitting the stunning rod to return to the first position wherein the catch piston is positioned along the longitudinal axis away from the housing front end. The catch piston urging the catch end portion toward the stunning rod longitudinal axis in the hold position and the catch body into contact with the stationary catch support distal end, thereby holding and preventing the stunning rod from being driven forward until the valve is operated.

The catch pivot may comprise a lip extending inwardly from an end of a catch pivot body and the catch body may include a flange extending outwardly away from the longitudinal axis. The catch body flange may engage the inwardly extending catch pivot lip to permit the catch to pivot between the hold and release positions while the catch body moves into and out of contact with the stationary catch support distal end, respectively.

The catch pivot may comprise a ring and extend around the longitudinal axis, and the stationary catch support distal end may be circular and extend around the longitudinal axis. There may be a plurality of catches arranged about the longitudinal axis, with each catch having a body portion curved in an arc about the longitudinal axis. The catches pivoting on the catch pivot ring between the hold and release positions while the catch body moves into and out of contact with the stationary catch support distal end, respectively.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF EXEMPLARY EMBODIMENT(S)

Figure 1:
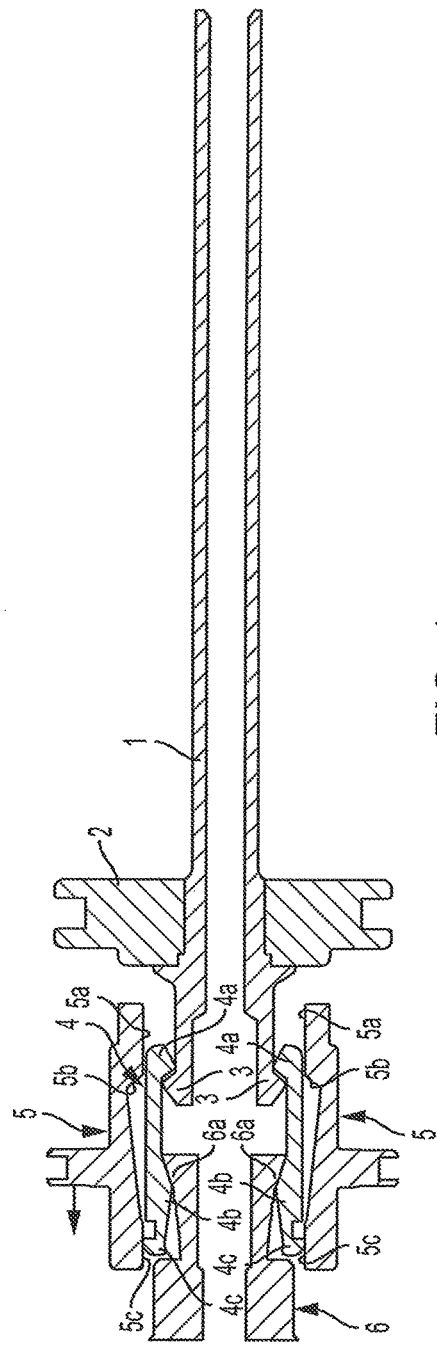
FIGS. 1 and 2 are cross sectional views of a prior art stunner catch system in hold and release positions, respectively.
Figure 2:
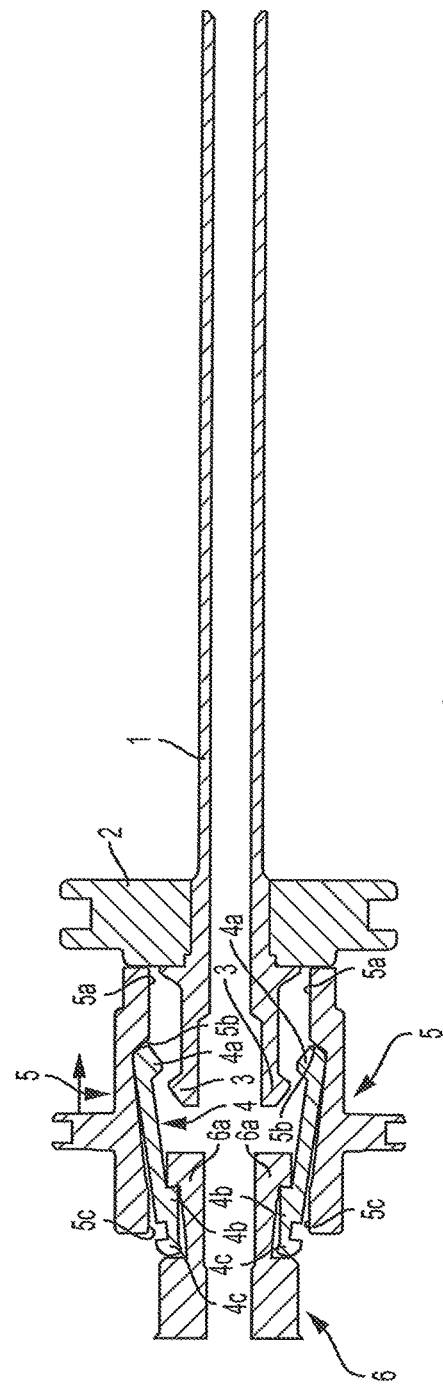

In describing the embodiments of the present invention, reference will be made herein to FIGS. 3-31 of the drawings in which like numerals refer to like features of the invention.

Structure and operation of the exemplary animal stunner 10 is shown in general in FIGS. 3-8. The stunner 10 includes an outer elongated hollow housing 12, an outer housing nose or front end 14, a tail end 16, a stunning rod 40 and a catch 20 for holding and releasing the stunning rod 40. The portion of the animal stunner 10 having a catch is shown in detail in FIGS. 7 and 8. The forward and rearward directions described herein are with respect to the stunner front end 14, and inward and outward directions described herein are with respect to the longitudinal axis 42. A piston 48 surrounded by an O-ring seal 66 slides within an inner cylindrical chamber 180 forward and rearward along axis 42, and carries stunning rod 40. The rearward end of stunning rod 40 ends in an outward extending lip 46 that is alternately held and released by catch 20, and the forward end of the stunning rod extends through head contact 18 to be driven toward the animal's head when the catch releases the stunning rod lip 46.

Figure 25:
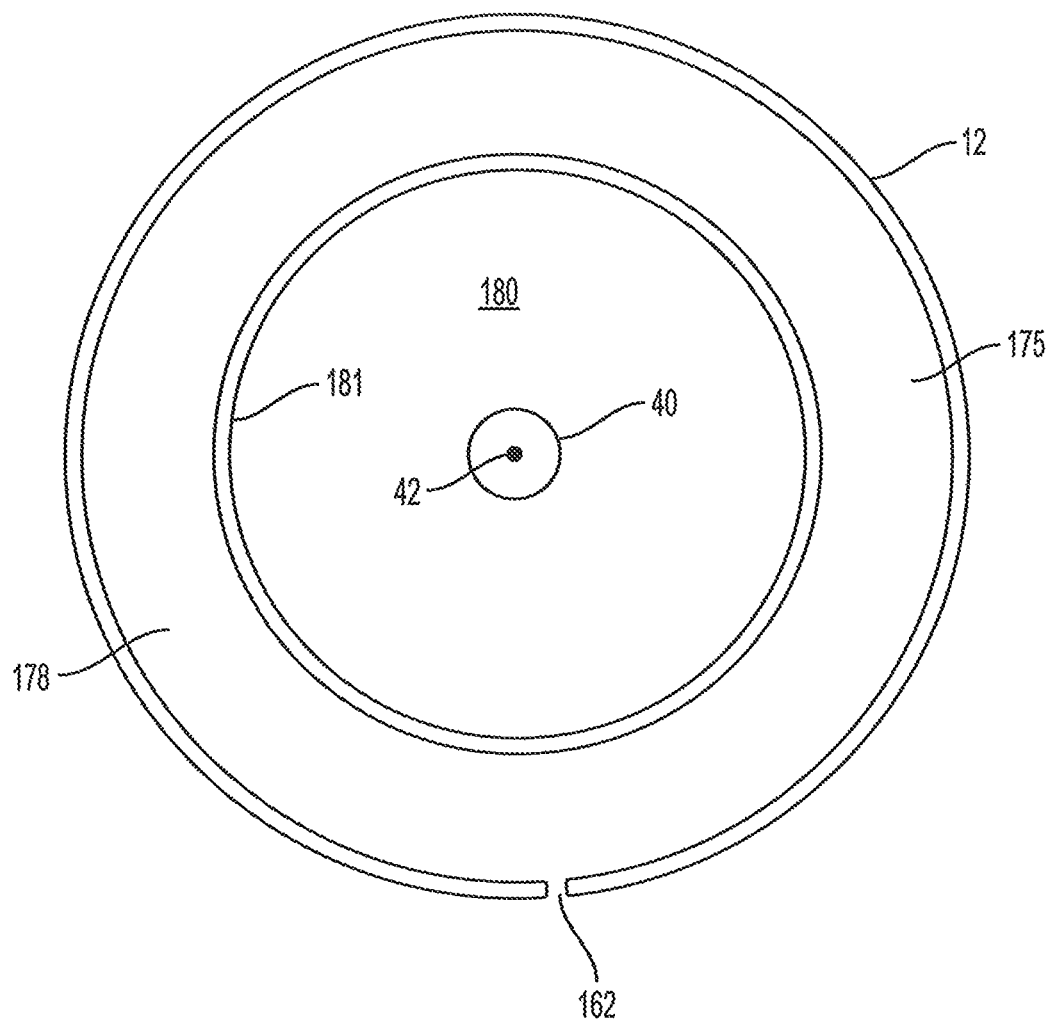
FIG. 25 is a partial cross sectional view of the housing of the stunner of FIGS. 3-6 normal to its longitudinal axis, showing the inner and return air chambers along lines 26-26 of FIGS. 3-6.

Stunner 10 may be operated by pressurized fluid, such as compressed air for the example shown. Outward of and shown as surrounding inner chamber 180 adjacent its central portion and rearward end is annular cylindrical first pressure or fire chamber 170. Compressed air can move freely and quickly between fire chamber 170 to the region of inner chamber 180 behind piston 48 upon operation of main valve 165. As shown in FIG. 25, annular cylindrical second pressure or return chamber 175 is also adjacent to, and shown as surrounding inner chamber 180 adjacent its central portion and forward end in the example of FIGS. 3-6. A catch piston chamber 188 is located adjacent and around catch piston 50, which itself holds and releases catch 20. Chambers 170, 175, 180 and 188 may be pressurized to operate the stunner shown, as will be described in more detail below.

A first or main trigger 146 in main handle 136 is used to control a main handle valve 142 to the pressurized fluid, compressed air as used herein, to initiate the sequence that fires the stunning rod. For purposes of safety, to operate the exemplary stunner shown there are two additional conditions that must be met before the catch mechanism for the stunning rod is released. The head contact activator 18 located at the front of the tool must be in contact with the animal to receive the stroke and a second or auxiliary trigger 114 in auxiliary handle 110 must be manually operated. Although it is possible to construct and operate the stunner with only one of these three, at least two, and preferably all three, should be employed for safety.

Figure 26:
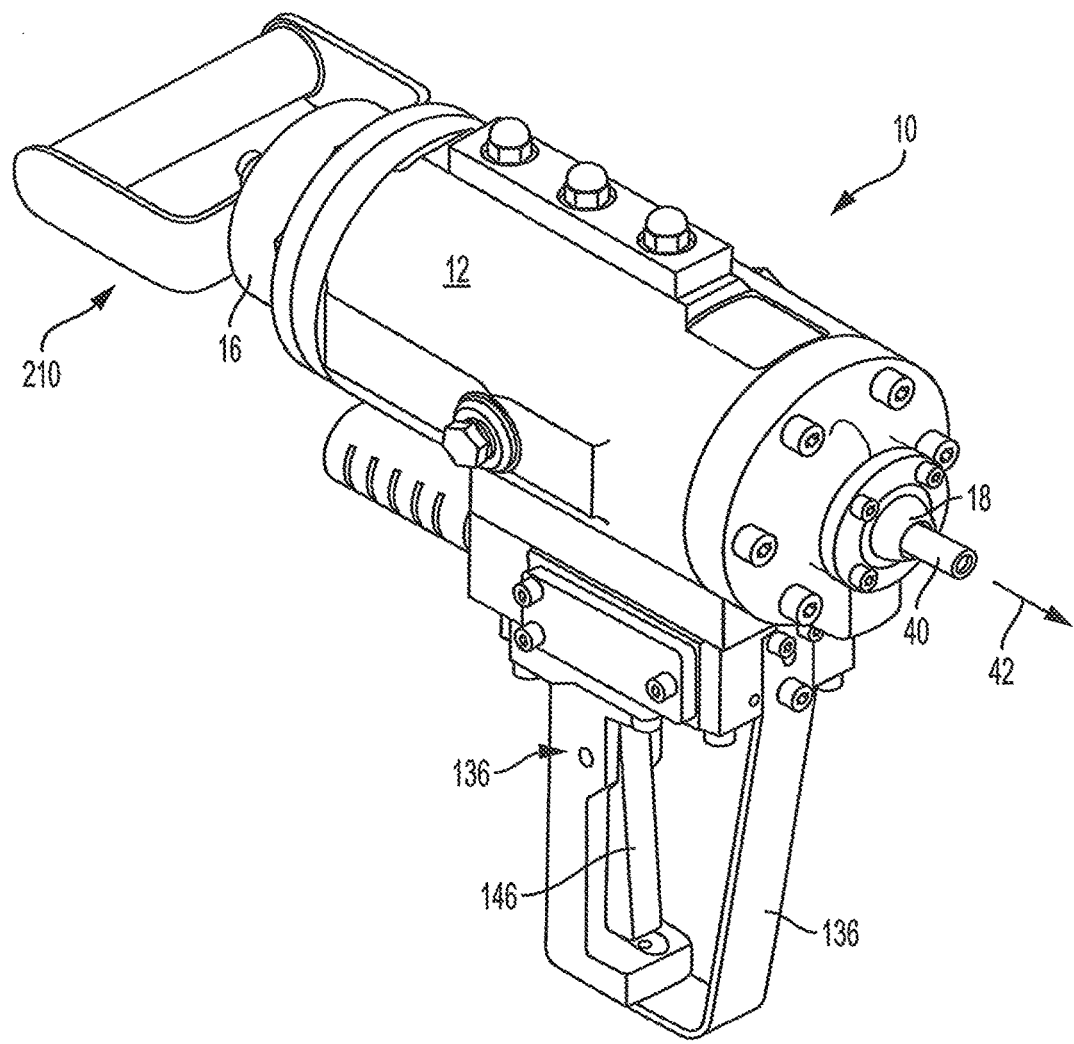
FIG. 26 is a perspective view of another embodiment of the stunner of the present invention, without the auxiliary trigger in the rear handle.
Figure 27:
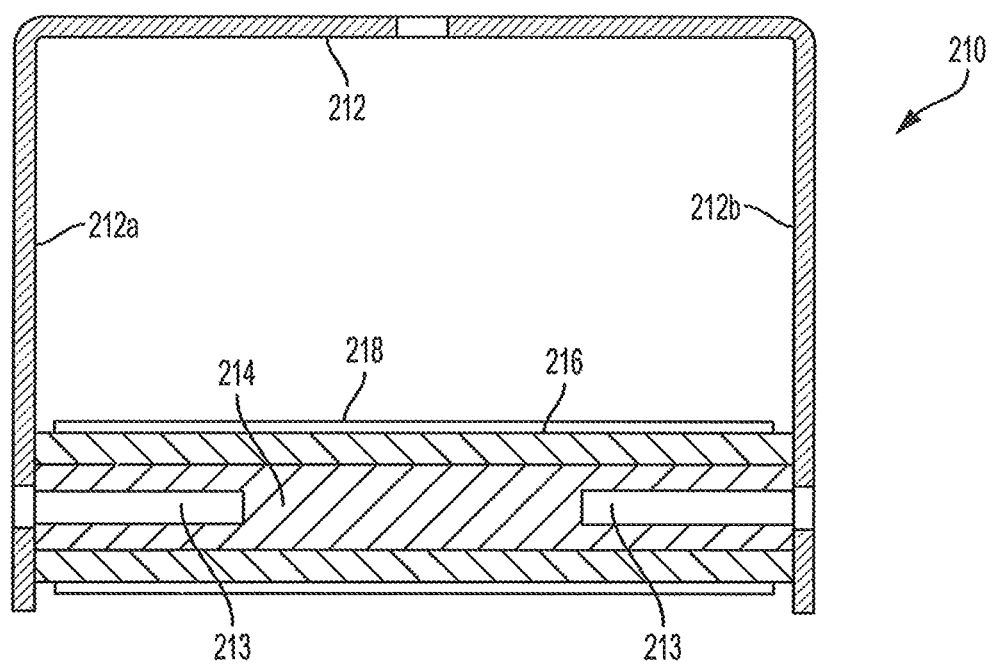
FIG. 27 is a cross sectional view of the handle grip of the stunner of FIG. 26.

An embodiment of the present invention employing main trigger 146, controlling main handle valve 142, and head contact activator 18 is shown in FIG. 26. In this embodiment, a second or auxiliary trigger is not provided, and instead a grip handle 210 is positioned at the tail end 16 of housing 12. Grip handle 210 as shown in FIG. 27 comprises a mounting bracket 212 and an inner handle bar 214 secured by a pair of connecting rods 213 extending inwardly from a pair of mounting bracket arms 212a, 212b. A flexible mount 216 of rubber or other polymer surrounds inner bar 214 to provide cushioning to outer handle tube 218 disposed thereover. In this embodiment the operator may hold grip handle 210 in one hand while holding main handle 136 in the other. While depressing and holding trigger 146 in main handle 136, the operator may then displace head contact activator 18 against the head of the animal to fire the stunning rod.

Figure 3:
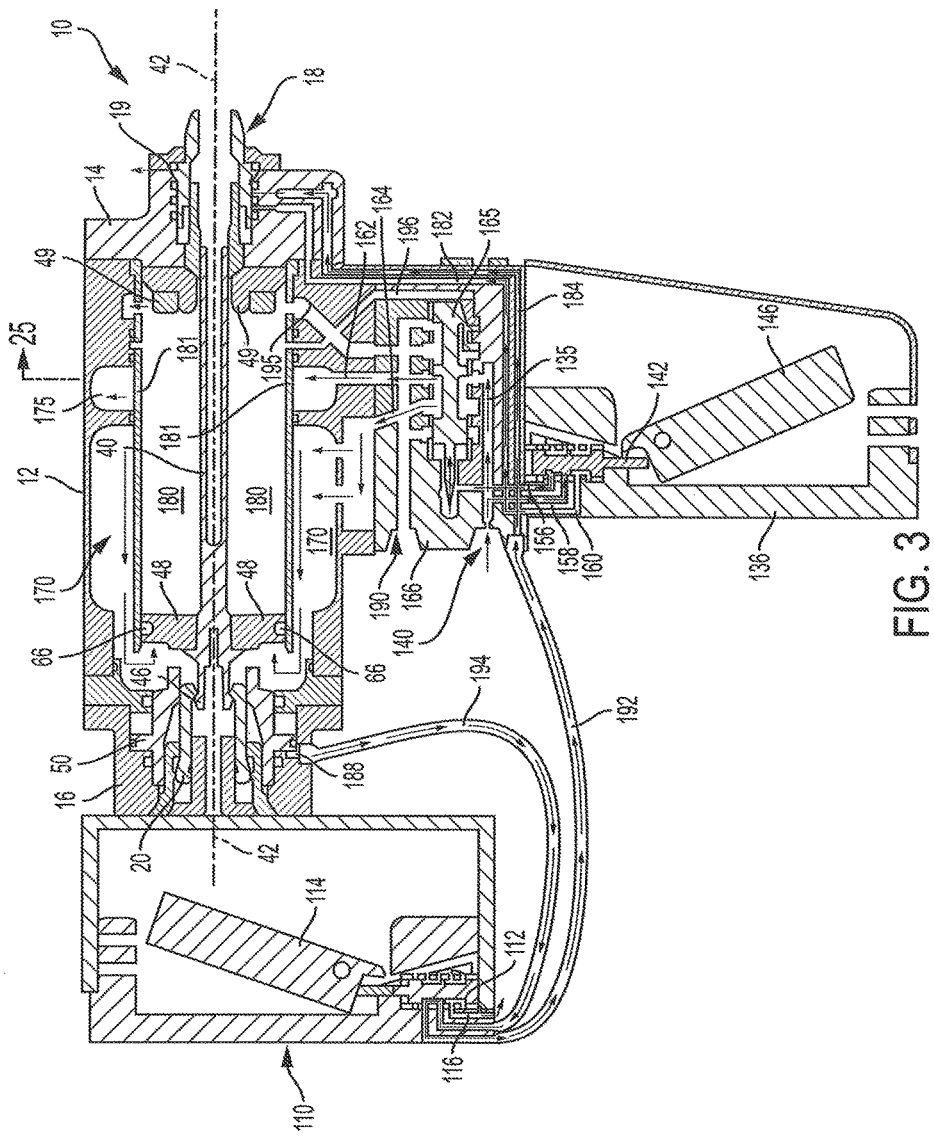
FIG. 3 is a side cross-sectional view of an animal stunner with the catch hold position, with valves in neutral position, with the air supply pressurized and prior to firing, according to the present invention.

FIG. 3 shows the animal stunner 10 with the catch 20 hold position, with valves in the neutral position, and with the air supply pressurized and prior to firing. An air hose (not shown) is attached to the supply port 140 on the main chamber valve body 166, and main valve body 166 is pressurized by the compressed air. Main valve 165 within valve body 166 is positioned to the right by spring (not shown) pressure and pressure force conveyed from air passages 158 (connected to supply port 140) through the main handle valve 142 and then through passageway 156. The main valve spool 165 in this position will simultaneously pressurize, via passageways 135, 162 and 164, the fire chamber 170 and also the smaller return chamber 175, both at a slower fill rate. The stunning rod piston 48 is fully pressurized by air flow from fire chamber 170 behind the piston, and retained from movement by the closed catch 20 assembly holding stunning rod lip 46, as will be explained further below. The main handle valve 142 is in the neutral position and not yet activated by main trigger 146, and valve 142 is extended by spring (not shown) pressure downward, so that the air passage via passageway 184 to the head contact 18 is vented through the main handle valve 142. The head contact 18 is extended by spring (not shown) pressure forward (rightward). Any air pressure on the extend side of the catch piston 50 in chamber 188 is vented via passageways 194 through the auxiliary handle vent 116, and any air pressure in passageway 192 is vented via passageway 184 through the head contact vent 19. The area under and behind the stunning rod piston 48 is vented through the main valve body 166 into the exhaust port 190. The stunner will not fire in this position, wherein main trigger 146, auxiliary trigger 114 and head contact 18 are not depressed.

Figure 4:
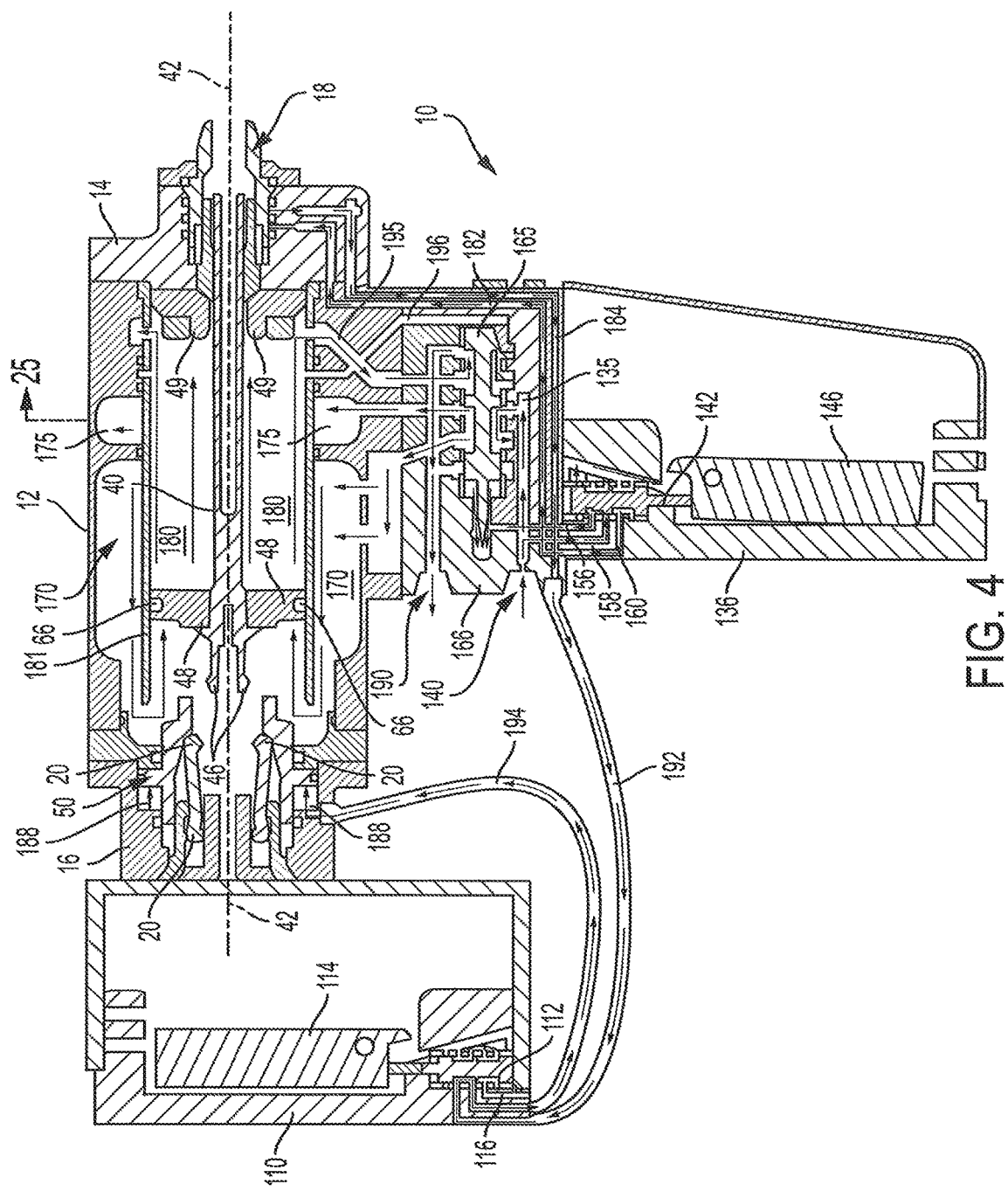
FIG. 4 is a side cross-sectional view of the animal stunner of FIG. 3 with the catch release position, with valves in the firing position, according to the present invention.

FIG. 4 shows the animal stunner with the catch 20 release position, with valves 142, 165, 112 and 18 in the firing position. To commence the firing sequence, the main handle valve 142 is activated by the operator depressing main trigger 146 with one hand, head contact 18 is activated by the operator pressing against the animal's head to move the contact rearward (leftward), and auxiliary handle valve 112 is activated by the operator depressing auxiliary trigger 114 with the other hand. As the main handle valve moves into the upward position, air passage from the main handle valve 142 to main valve spool (spring end) is exhausted via passageway and air passage from the main handle valve 142 to head contact 18 is pressurized via passageway 182. Compressed air also flows via air passage 194 to the catch piston cylinder chamber 188 after flow through the head contact valve 18, passageway 184 and passageway 192 through the auxiliary handle valve 112. As a result of head contact 18 being depressed and auxiliary handle valve 112 being pressurized, catch piston 50 is moved by the compressed air in chamber 188 and extends forward (rightward) to its limit and opens the catches 20. As a result, stunning rod 40 is released and moves forward (rightward) at a high rate of speed, while the air in chamber 180 under and forward of the stunning rod piston 48 is exhausted through passageway 195 and the main valve body 166 exhaust port 190.

Figure 5:
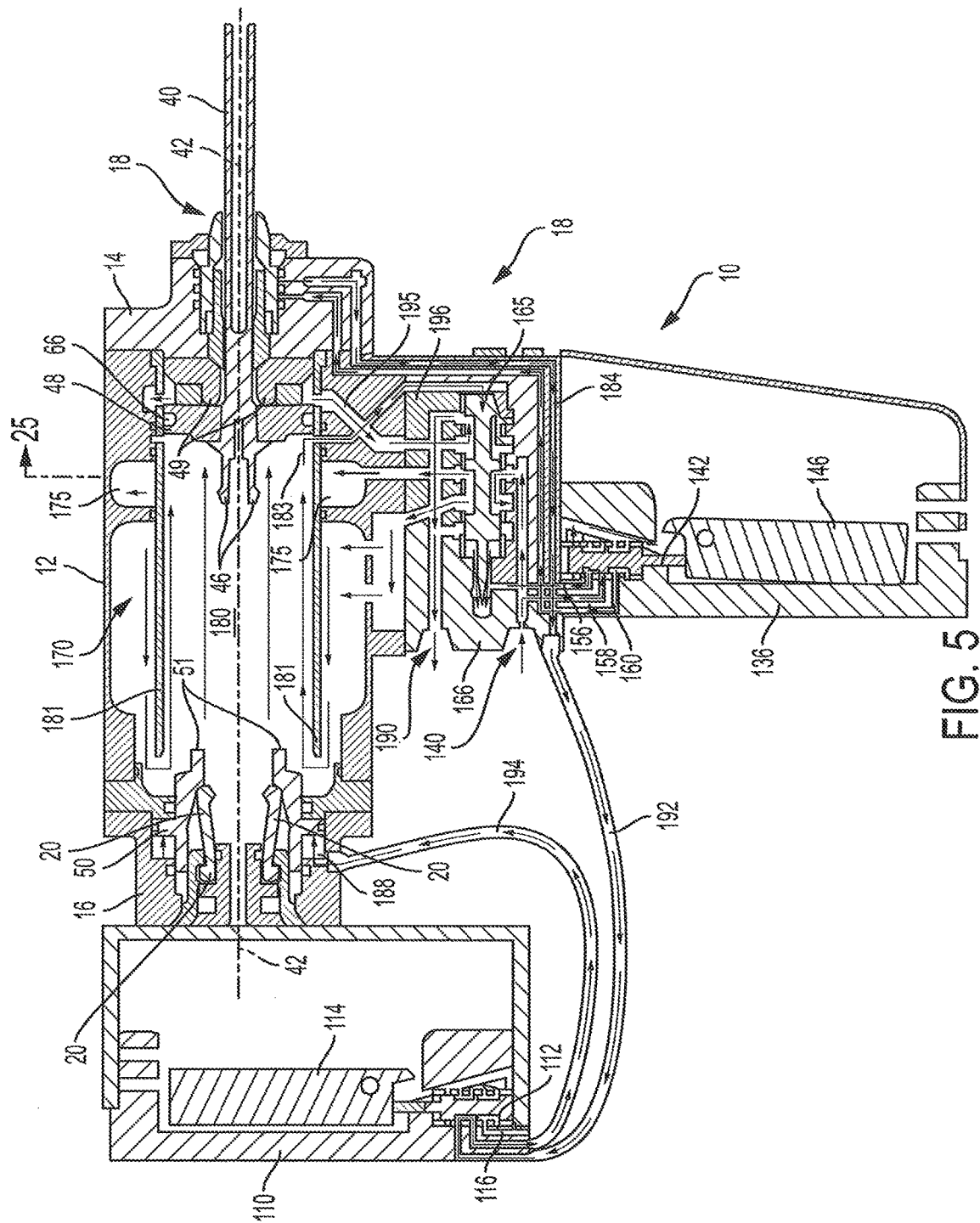
FIG. 5 is a side cross-sectional view of the animal stunner of FIG. 3 with the stunning rod in the end-of-stroke position, according to the present invention.

FIG. 5 shows the animal stunner 10 with the stunning rod 40 in the full forward, end-of-stroke position. The stunning rod stroke is stopped by the annular cushions 49 next to and inside of the nose housing 14. In this position the stunning rod piston seal 66 extends forward and beyond the small holes 183 in the liner 181 of chamber 180 allowing air flow into the main valve reverse passage 196 to the bottom (rightward) end of the main valve spool 165. As main valve 165 is pressurized, the spool commences moving upward (leftward) against the pressure of the spring to reverse the flow of air to the stunning rod piston 48.

Figure 6:
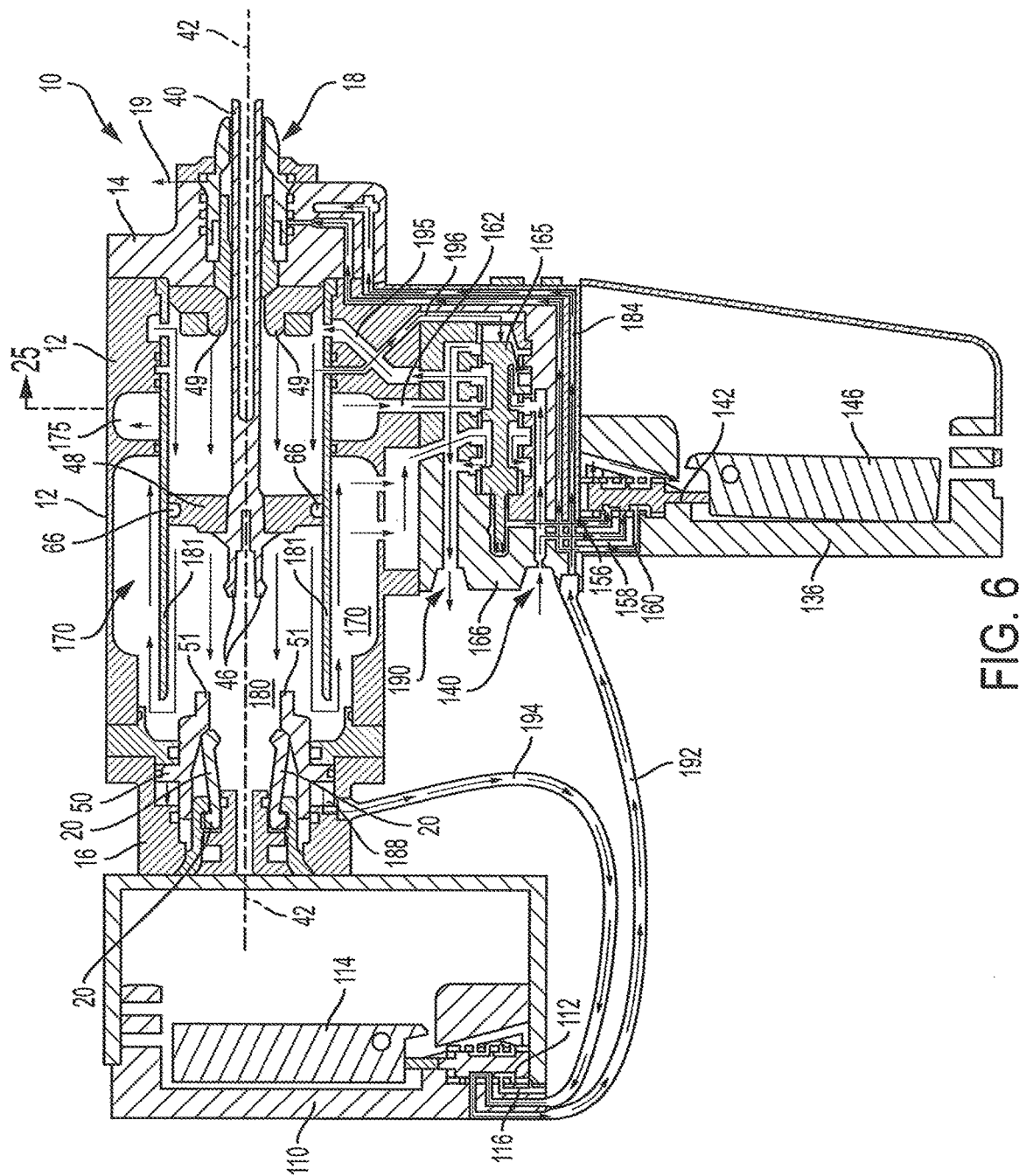
FIG. 6 is a side cross-sectional view of the animal stunner of FIG. 3 with the air in main valve in the reverse position to retract the stunning rod, according to the present invention.

FIG. 6 shows the animal stunner near the end of the firing sequence with the air in main valve 165 moved into the reverse position to retract the stunning rod, as a result of compressed air flow from reverse passage 196 (FIG. 5). Both main handle valve 142 and auxiliary handle valve 112 are still depressed and activated, but head contact 18 is released from the animal's head so that contact valve 18 returns to the forward (rightward) position. Main valve 165 reverse passage 196 is pressurized forcing the main valve spool to move upward (leftward) against the pressure of the spring, so that the main valve body air flow is reversed. As this occurs, fire air chamber 170 is exhausted through the main valve body 166 into the exhaust port 190, and air flow is reversed via passage 194 from the catch piston 50 chamber 188 through open auxiliary handle valve 112, passageways 192 and 184 and out through the head contact 18 vents 19 when the head contact 18 is released. The compressed air pressure immediately available from the return chamber 175 causes pressurized air to move freely and quickly to flow via passageways 162 (FIGS. 6 and 25), main valve 165 and passageway 195 into the forward (rightward) end of chamber 180 (FIG. 6). Although return chamber 175 is volumetrically smaller and contains less pressurized fluid than fire chamber 170, it is sized to provide sufficient air to drive piston 48 and stunning rod 40 rearward. This use of compressed air from adjacent return chamber 175 reduces the volume of air needed as compared to prior art methods where the air to return the piston is supplied via internal passageways from the supply port. Instead of relying on a short, higher pressure blast of compressed air through the supply port at the same time the piston return cycle is initiated, the present invention pre-supplies the compressed piston return air at the same time the fire chamber is pressurized, during the longer time available between operation cycles. This permits restriction orifices of desired sizes to be used at the supply port 140, thereby saving on total air volume usage by the stunner.

The pressurized air in chamber 180 forward end retracts the stunning rod 40 rearward (leftward) as shown in FIG. 6 until piston 48 contacts the forward end 51 of catch piston 50. As a result of the piston striking it, the catch piston 50 is retracted rearward (leftward) into the catch cylinder 188, which closes the catches 20 by forcing them inward to capture stunning rod lip 46, so that the stunning rod 40 is retained by the catches, as shown in FIG. 3.

When the main handle valve 142 is returned to neutral as a result of main trigger 146 being released and in the undepressed position (FIG. 3), air passage to main valve spool (spring end) is again pressurized, and shifts valve 165 to its original position. Both fire chamber 170 and return chamber 175 are again pressurized, air passage to the nose is exhausted via vent 19, auxiliary handle valve 112 returned to neutral as a result of auxiliary trigger 114 being released, any pressure is vented through vent 116 of the auxiliary handle valve 112, so that air passage to the catch piston 50 is vented two ways for safety, and will not fire again until the firing sequence is again started. The order of firing sequence makes no effect on the performance, and both triggers 146, 114 and the head contact 18 must be activated in any order before firing will occur in this embodiment.

Figure 28:
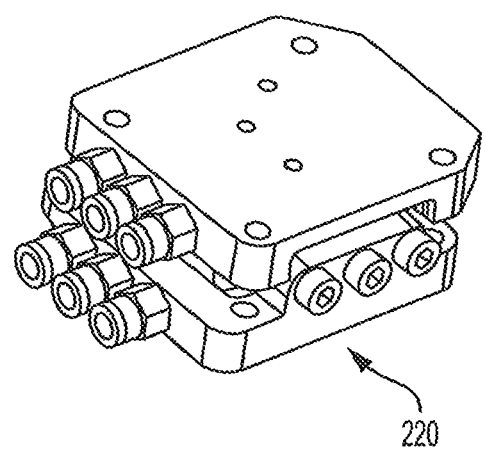
FIG. 28 is a perspective view of an embodiment of a mount employed between the main handle and main valve body of the stunner of the present invention.
Figure 29:
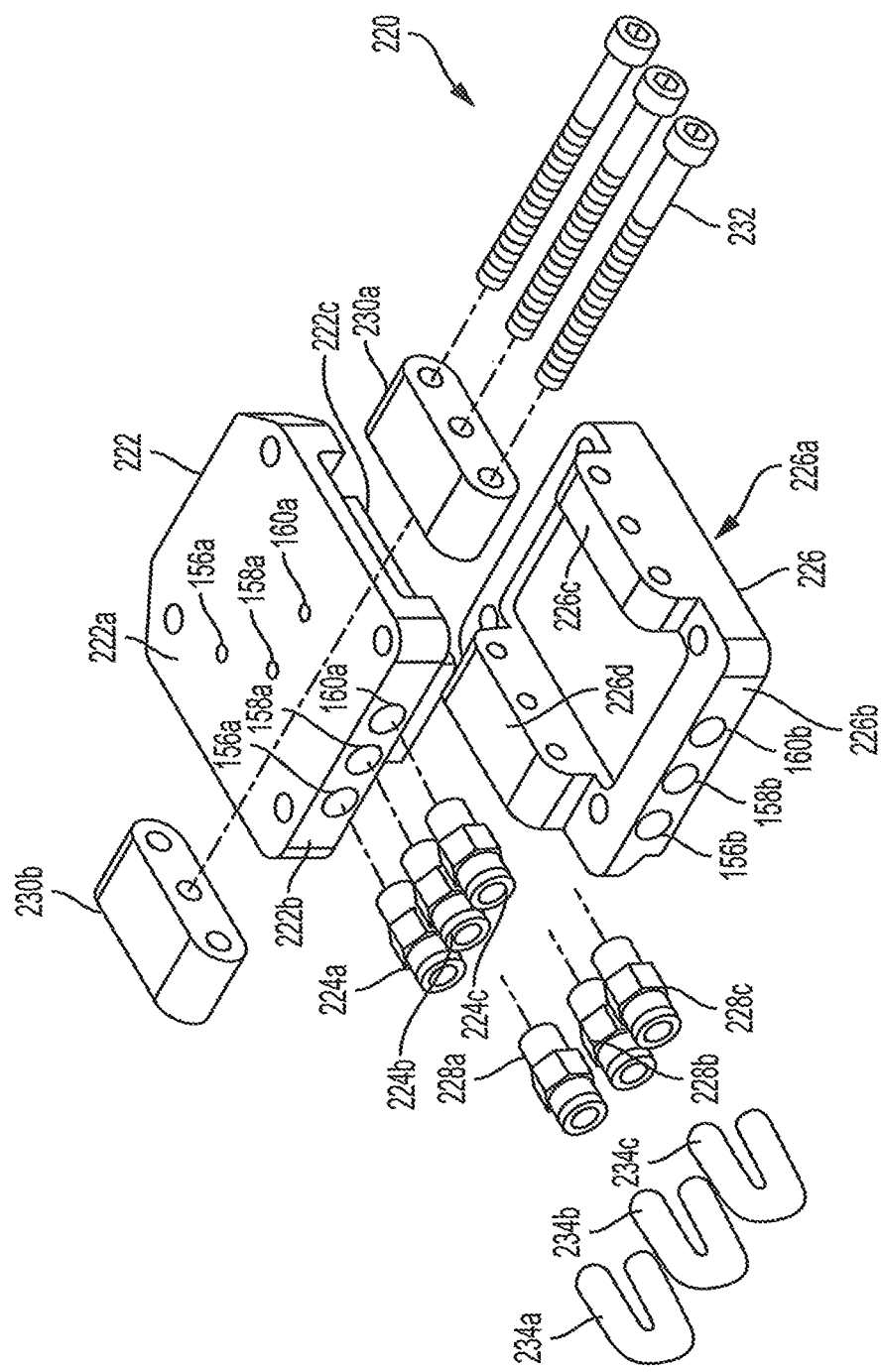
FIG. 29 is an exploded perspective view of the handle mount of FIG. 28
Figure 30:
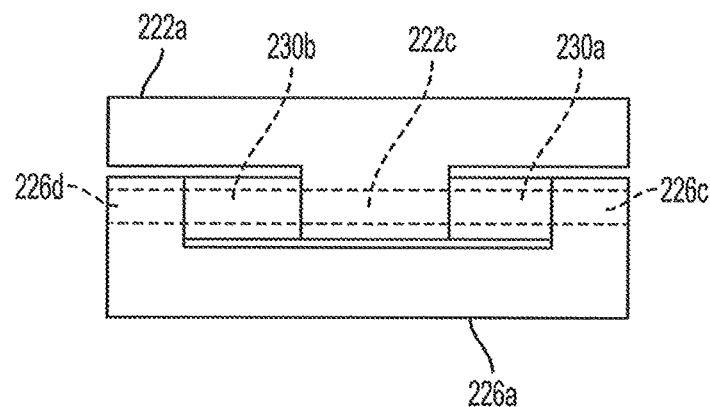
FIG. 30 is a cross sectional view of the mount of FIG. 28 showing the anti-shock members.

Main handle 136 is shown in FIGS. 3-6 as being secured directly to main valve body 166. To provide cushioning to mitigate any shock due to the firing of the stunning rod, and therefore reduce operator injury and increase operator comfort, there may be provided a cushion mount for main handle 136. Such a mount 220 is shown in FIGS. 28-30 for insertion between main handle 136 and main valve body 166. Cushion mount 220 includes a first or upper portion 222, which is connected or otherwise secured to the lower side of housing 12, and a second or lower portion 226, which is connected or otherwise secured to the upper end of main handle 136. Upper portion 222 includes passageways 156a, 158a, 160a which mate at upper surface 222a with passageways 156, 158, 160, respectively, (FIGS. 3-6) opening from the lower end of main valve body 166. Passageways 156a, 158a, 160a connect through upper portion 222 at side surface 222b with fittings 224a, 224b, 224c, respectively. In lower portion 226 passageways 156b, 158b, 160b mate at lower surface 226a with passageways 156, 158, 160, respectively, (FIGS. 3-6) opening from the upper end of main handle 136. Passageways 156b, 158b, 160b connect through lower portion 226 at side surface 226b with fittings 228a, 228b, 228c, respectively. Hoses or tubes 234a, 234b, 234c connect fittings 224a, 224b, 224c with fittings 228a, 228b, 228c, respectively.

Between mount upper portion 222 and a lower portion 226 there are provided a pair of anti-shock members 230a, 230b, which may be made of rubber cushions or other flexible polymer. Anti-shock members 230a, 230b may be in the configuration of elongated blocks (i.e., parallelepipeds) or other shapes disposed on either side between a central flange 222c extending downwardly from upper portion 222, and a pair of side flanges 226c, 226d extending upwardly from lower portion 226. One or more fasteners 232, here shown as three bolts, may extend in the same direction as or normal to longitudinal axis 42 into and through corresponding aligned openings in side flange 226c, anti-shock member 230a, central flange 222c, anti-shock member 230b and side flange 226d. The major surfaces of members 230a, 230b and axes of the fasteners 232 are contained in planes parallel to the longitudinal axis 42 of the housing 12. Except for the fasteners, anti-shock members 230a, 230b completely isolate mount upper portion 222 from mount lower portion 226, and absorb vibration and shock transmitted from the body of stunner 10 to main handle 136.

Figure 31:
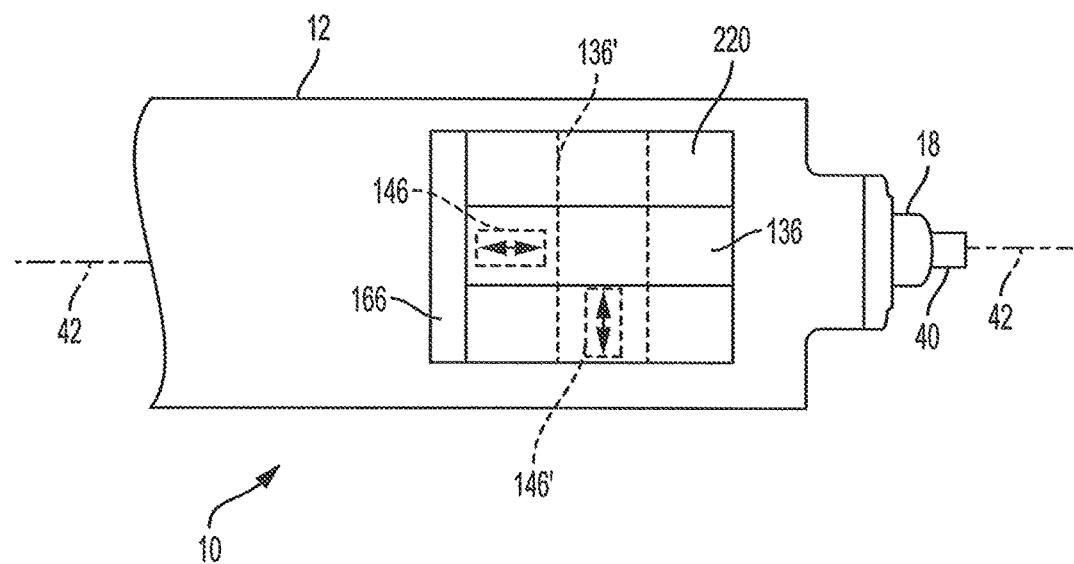
FIG. 31 is a bottom view of an embodiment of the main handle and mount of the stunner of the present invention, showing different fixed orientations of the main handle and trigger.

With or without the anti-shock members, mount 220 may be provided in different patterns of passageways 156a, 158a, 160a and/or passageways 156b, 158b, 160b, to connect to the main handle 136 and/or main valve body 166 at different orientations than the conventional one shown in the drawings, where the trigger 146 movement is aligned with the longitudinal axis 42 of the stunner housing 12. As shown in FIG. 31, this would permit handle 136 and trigger 146 movement to be mounted to main valve body 166 or housing 12 in a different fixed position and aligned to an orientation other than that of stunner longitudinal axis 42, for example, with handle 136' and trigger 146' movement in a direction 90° to axis 42. The different main handle orientations may accommodate different layouts in the plant operations or operator comfort, for example, due to pneumatic activation instead of mechanical activation of the valve with the trigger.

Figure 11:
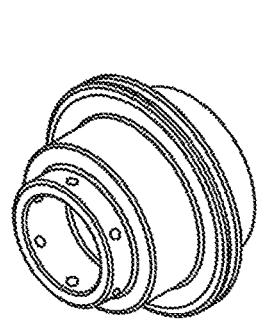
FIG. 11 is a perspective view of the catch piston according to the present invention.
Figure 12:
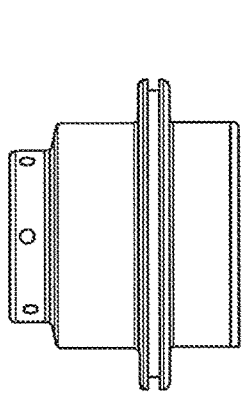
FIG. 12 is a side elevational view of the catch piston shown in FIG. 11.
Figure 13:
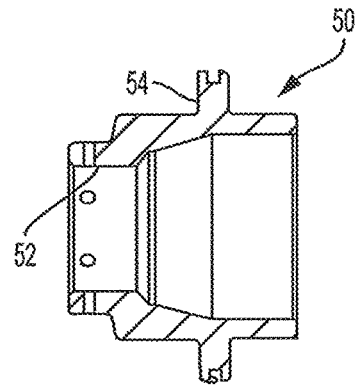
FIG. 13 is a side cross sectional view of the catch piston shown in FIG. 11.
Figure 14:
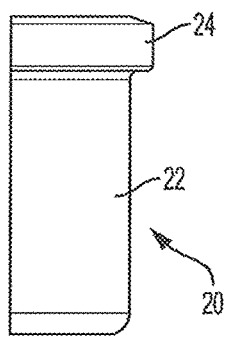
FIG. 14 is a side elevational view of a catch according to the present invention.
Figure 15:
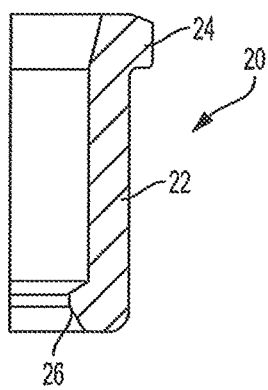
FIG. 15 is a cross sectional view of the catch shown in FIG. 14.
Figure 16:
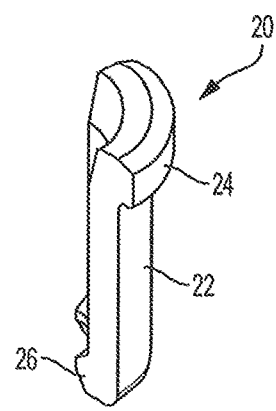
FIG. 16 is a perspective view of the catch shown in FIG. 14.

The structure and operation of catch 20 with respect to stunning rod 40 is shown in more detail in FIGS. 7-24. FIGS. 7-10 show the stunning rod 40 comprising an elongated cylindrical body 44 having a longitudinal axis 42. A stunning rod lip 46 is disposed on one end of the stunning rod 40. FIGS. 11-13 show a catch piston 50 having a smooth inner bore 52 and a catch piston flange 54. The stunning rod 40 is axially disposed on piston 48 within the housing 12 and is capable of being driven forward along the longitudinal axis 42 towards the front end of the housing 12 when pressurized air or other pneumatic fluid enters the chamber, as described above. The stunning rod 40 shown with the forward end sized for penetrating the animal's head, but other stunning rod designs and styles may be employed, including those with sufficiently large diameter of the forward end to prevent penetration of the animal being stunned.

Figure 7:
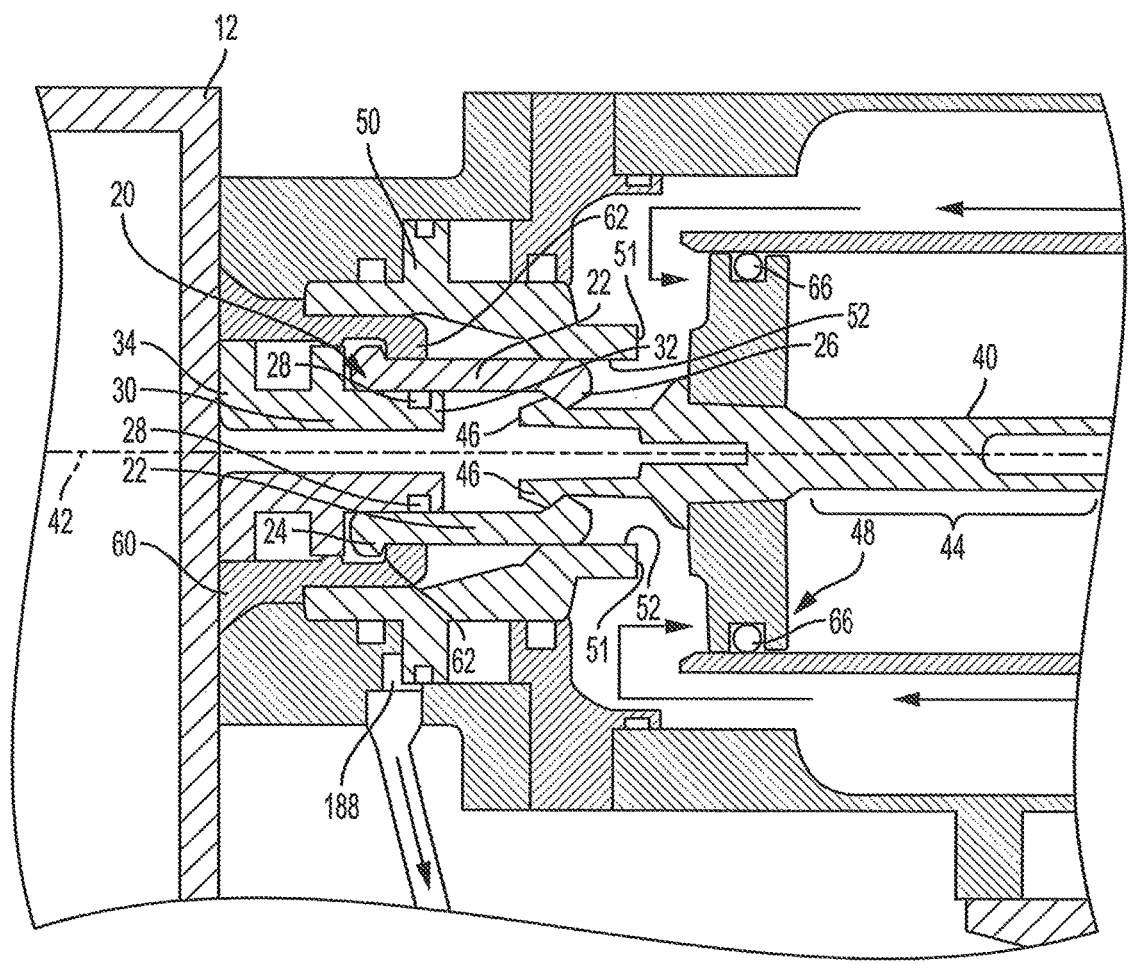
FIG. 7 is an enlarged cross-sectional view of the animal stunner catch system shown in the hold position of FIG. 3.
Figure 8:
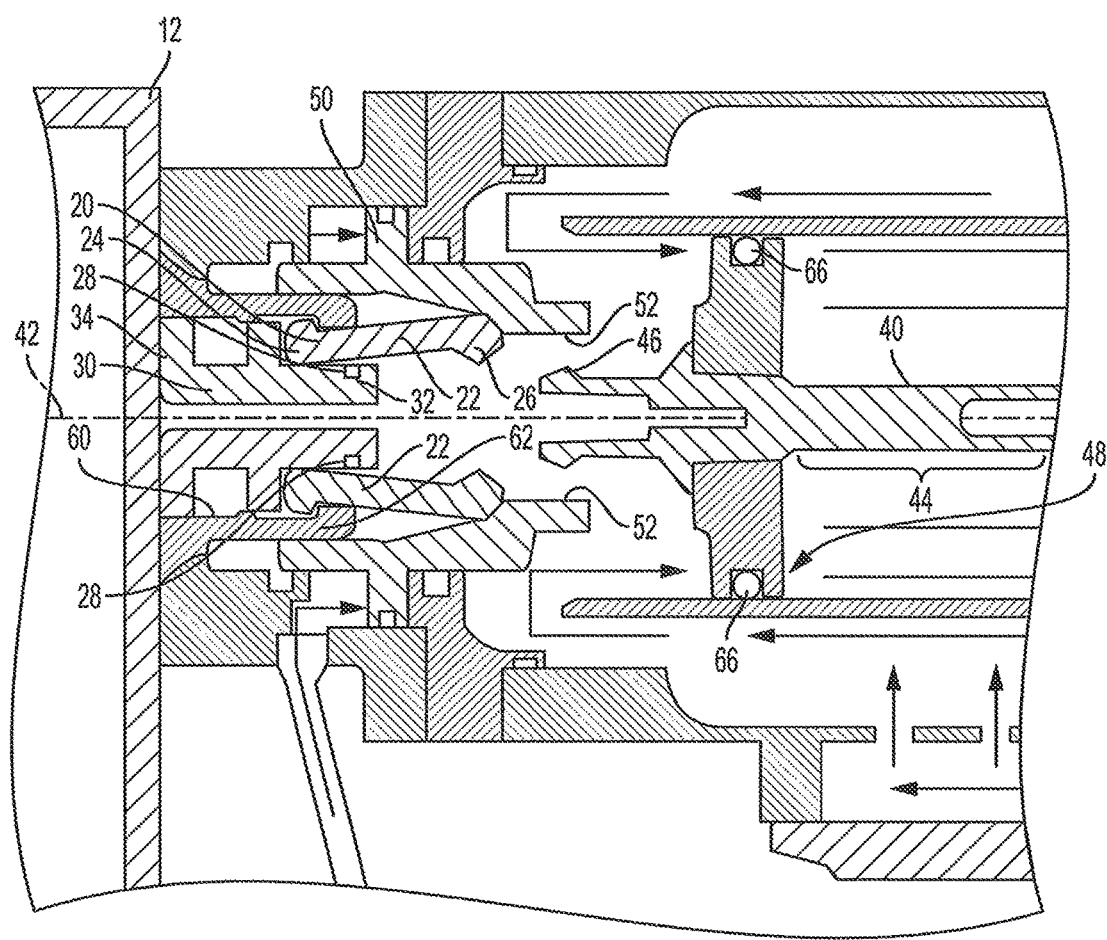
FIG. 8 is an enlarged cross-sectional view of the animal stunner catch system shown in the released position of FIG. 4.
Figure 9:
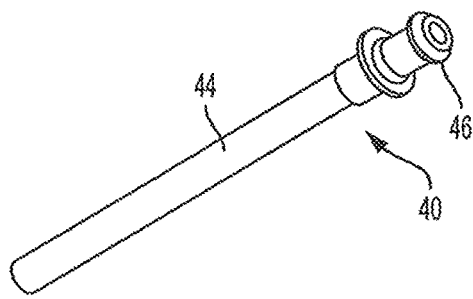
FIG. 9 is a perspective view of one example of the stunning rod according to the present invention.
Figure 10:
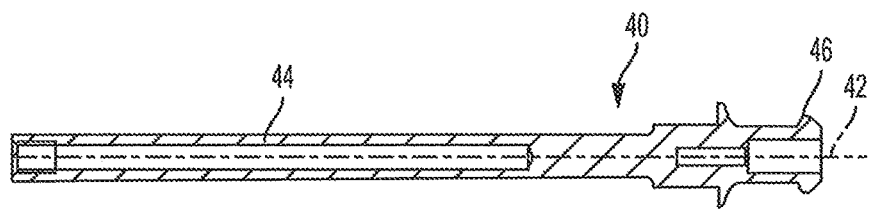
FIG. 10 is a cross sectional view of one example of the stunning rod of FIG. 9.

FIGS. 14-17 show catch 20 having a catch body 22, at the forward end a catch end portion 26 with inward extending lips and near the rearward end an outward extending catch flange 24. Catch 20 is mounted within the housing 12 outside of the stunning rod longitudinal axis 42 for alternately holding and releasing the stunning rod 40. The catches 20 shown in FIGS. 3-8 are two of four arcuate catches that may be arrayed around axis 42 as shown in their hold position FIG. 17 and employed in the example depicted in the drawings. Fewer or more than four catches may be employed. Catch body 22 rotates with respect to a catch pivot or post, shown herein in the form of a catch pivot ring 60 extending around the outer sides of the catch bodies (FIGS. 7 and 8). The catch flange 24 extends outwardly away from axis 42 and is engagable with a catch pivot ring inner lip 62 extending inwardly from the end of the cylindrical body 64 of catch pivot ring 60 shown in FIGS. 18-20.

As shown in FIGS. 7 and 8, catch body portion 22 is pivotally mounted on inner lip 62, between stationary catch pivot ring 60, disposed on a side away from axis 42, and stationary catch support 30 (see also FIGS. 21-24), disposed on a side toward axis 42. The catch support 30 has a cylindrical body portion 36 and includes a circular support head 34 disposed adjacent the back portion of the housing 12 and a circular catch support distal end 32 which is disposed within the four arcuate catches 20. An external groove 33 is disposed in and around the outside of body 36 adjacent end 32 to receive an optional O-ring (discussed further below). The catch body portion 22 is disposed on an outward side of catch support 30 away from the stunning rod longitudinal axis 42. The catch 20 includes the end portion 26 extending from the body portion 22 toward the housing front end 14 and distal from the catch support 30. Since the example employs a plurality (four) catches arrayed about longitudinal axis 42, each catch 20 is constructed and held between catch pivot ring 60 and catch support 30 so that their ends 26 are normally extended away from each other and axis 42. The catch end portion 26 is movable by catch piston 50 to a hold position toward the longitudinal axis 42, where it engages stunning rod lip 46 preventing the stunning rod 40 from being driven forward. In the hold position catch body 22 is in contact with both the stationary catch pivot ring 60 and the stationary catch support distal end 32.

When catch piston 50 is longitudinally moved forward (FIG. 8), as will be described further below, the constraint placed on catch end portion 26 is removed, and the end portion 26 moves outward to a release position away from stunning rod lip 46 and the stunning rod longitudinal axis 42 permitting the stunning rod 40 to be driven forward. Outward movement of catch end portion 26 is caused by sliding movement of the angle or taper between the forward portion of stunning rod lip 46 and the rearward portion of the inward facing lip of catch end portion 26, as stunning rod 40 moves longitudinally forward. Catch end portion 26 may optionally be assisted in being urged to spring outward by an optional catch tension O-ring or elastic member 28 wrapped around the body 36 of the catch support 30, in groove 33. When in the hold position (FIG. 7, O-ring or elastic member 28 is compressed by catch body 22, so that when catch piston 50 moves forward, member 28 expands, thereby urging the catch body 22 and end 26 away from axis 42, which assist then reduces wear on the outer forward tapered surface of stunning rod lip 46. In this catch end portion release position away from axis 42, catch body 22 is in contact with the stationary catch pivot ring 60 and out of contact with the stationary catch support distal end 32. The catch flange 24 is engaged with the catch pivot ring inner lip 62, allowing the catch flange 24 to be held pivotally between the catch pivot ring inner lip 62 and the catch support cylindrical body portion 36 (FIGS. 21, 23, 24), allowing the catch 20 to pivot about the catch flange as shown in FIG. 8.

Figure 17:
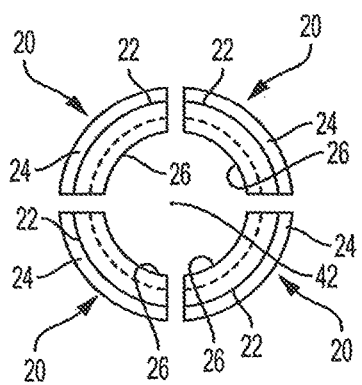
FIG. 17 is an end elevational view of four of the catches shown in FIG. 14 arrayed in the hold position around the longitudinal axis of the stunning rod.
Figure 18:
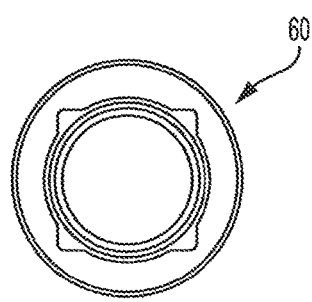
FIG. 18 is a top elevational view of the catch pivot ring according to the present invention.
Figure 19:
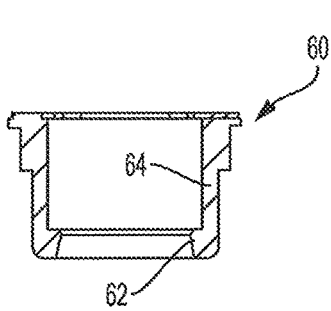
FIG. 19 is a side cross sectional view of the catch pivot ring shown in FIG. 18.
Figure 20:
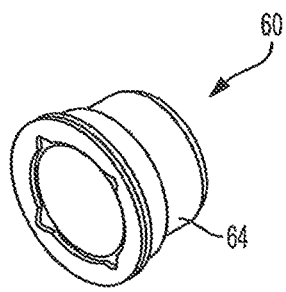
FIG. 20 is a perspective view of the catch pivot ring shown in FIG. 18.
Figure 21:
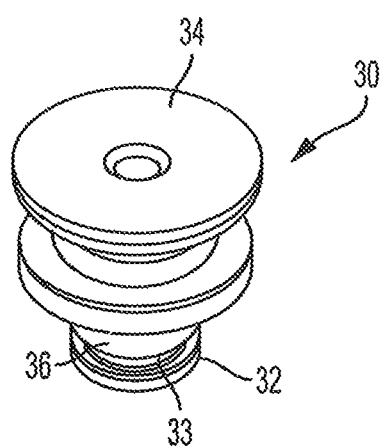
FIG. 21 is a perspective view of the catch support according to the present invention.
Figure 22:
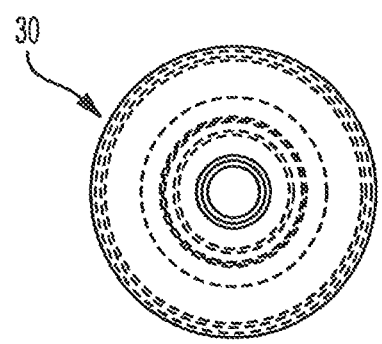
FIG. 22 is a top elevational view of the catch support shown in FIG. 21.
Figure 23:
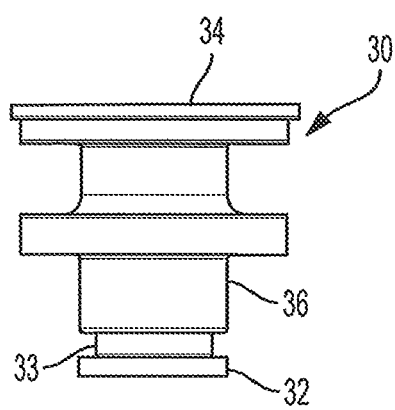
FIG. 23 is a side elevational view of the catch support shown in FIG. 21.
Figure 24:
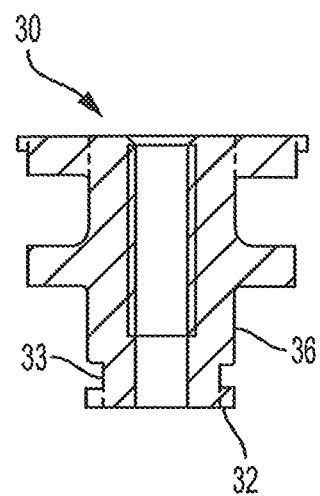
FIG. 24 is a side cross sectional view of the catch support shown in FIG. 21.

The catch 20 may be an arcuate section of a cylinder having an inner catch end portion 26 and an outer flange 24. The catch 20 shown in FIG. 16 has an arc of less than 90° as shown in FIG. 17 so that four catches 20 may be arranged cylindrically about the longitudinal axis 42 and within the catch pivot ring 60 with sufficient space between the catches 20 for the catches 20 to pivot on the catch pivot ring inner lip 62 without interfering with one another. The four catches 20 are supported from collapsing on one another by the catch support 30.

The catch piston 50 is disposed adjacent the catch end portion 26 on a catch side away from the longitudinal axis. The catch piston 50 is in sliding contact with the catch 20 adjacent the catch end portion 26 and out of contact with the catch body portion 22. The catch piston 50 is adapted to slide in the directions of the longitudinal axis 42 between a first, rearward position, shown in FIG. 3, urging the catch end portion 26 toward the stunning rod lip 46 longitudinal axis 42 in the hold position, thereby holding and preventing the stunning rod 40 from being driven forward, and a second, forward position, shown in FIG. 4, permitting the catch end portion 26 to move to the release position away from the stunning rod lip 46 longitudinal axis 42, releasing and permitting the stunning rod 40 to be driven forward.

As described above in connection with FIG. 6, at the end of the firing sequence piston 48 reverses direction in chamber 180, and moves rearward to strike the forward end 51 of catch piston 50, to move it rearward and force catches 20 inward, as shown in FIG. 7. In the closed or locked position, the catch end portion 26 is fully engaged with the stunning rod lip 46, holding the stunning rod 20 from moving forward. The catch 20 is held in the fully engaged position by the catch piston inner bore 52. In operation, as the firing sequence commences, the pneumatic pressure in chamber 188 moves the catch piston 50 forward (rightward) toward the housing front end 14. Once the inner bore 52 moves forward past the catch end portion 26, as shown in FIG. 8, the catch 20 pivots about the catch pivot ring inner lip 62 wherein each catch end portion 26 moves outward from the cylindrical orientation, disengaging the catch end portion 26 and the stunning rod lip 46. In the disengaged position, the catch body portion 22 is not in contact with the catch piston 50 or the stationary catch support distal end 32. The force of pressurized air drives piston 48 forward and stunning rod 40 moves along the stunning rod longitudinal axis 42 toward the housing front end 14 from the force of the pressurized air or other pneumatic fluid.

The present invention therefore provides an improved animal stunner having one or more of the following advantages. The stunning rod release system reduces wear of the moving parts controlling the operation of the animal stunner. The animal stunner has reduced drag on movement between the catch and catch piston during operation, and reduced wear on the catch and catch piston as a result of repeated operation. The catch system for the stunning rod is stronger and requires less replacement over extended periods of heavy operation, thus improving operator safety and animal stunning effectiveness. The stunner of the present invention uses less compressed air between each stunner cycle because of the ability to pre-supply piston return air in the return chamber during the initial pressurizing cycle. Additionally, the improvements to handle design, orientation and mounting provides improved operator comfort and reduction of possible injury.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A pneumatic animal stunner for stunning an animal comprising:
   a housing having a front end;
   an inner chamber in the housing having a forward end and a rearward end;
   a piston slideable within the inner chamber;
   a stunning rod within the housing and capable of being driven by the piston forward and rearward towards and away from the front end of the housing;
   a first pressure chamber adjacent the inner chamber, the first pressure chamber being in communication with the rearward end of the inner chamber, the first pressure chamber supplying a pressurized fluid rearward of the piston;
   a second pressure chamber adjacent the inner chamber, the second pressure chamber being in communication with the forward end of the inner chamber, the second pressure chamber supplying a pressurized fluid forward of the piston, the second pressure chamber being smaller than the first pressure chamber; and a valve system to alternately control flow of the pressurized fluid from the first pressure chamber to the rearward end of the inner chamber to move the piston and drive the stunning rod forward to stun an animal, and from the second pressure chamber to the forward end of the inner chamber to move the piston and drive the stunning rod rearward and retract the stunning rod.

2. The pneumatic animal stunner of claim 1 wherein the second pressure chamber is outward of and surrounds the inner chamber.

3. The pneumatic animal stunner of claim 2 wherein the second pressure chamber is of annular cylindrical configuration.

4. The pneumatic animal stunner of claim 1 wherein the stunning rod is driven along a longitudinal axis of the housing, and further including:

a handle having a valve and a moveable valve trigger; and a mount between the handle and the housing, the mount having at least one passageway for flowing pressurized air between the housing and the handle valve, the mount being securable to the housing to orient the handle in a fixed position wherein movement of the trigger is in a direction normal to the longitudinal axis.

5. A pneumatic animal stunner for stunning an animal comprising:

a housing having a front end;

an inner chamber in the housing having a forward end and a rearward end;

a piston slideable within the inner chamber;

a stunning rod within the housing and capable of being driven by the piston forward and rearward towards and away from the front end of the housing;

a first pressure chamber adjacent the inner chamber, the first pressure chamber being in communication with the rearward end of the inner chamber, the first pressure chamber being outward of and surrounding the inner chamber adjacent a central portion or rearward end of the inner chamber, the first pressure chamber supplying a pressurized fluid rearward of the piston;

a second pressure chamber adjacent the inner chamber, the second pressure chamber being in communication with the forward end of the inner chamber, the second pressure chamber supplying a pressurized fluid forward of the piston, the second pressure chamber being outward of and surrounding the inner chamber adjacent a central portion or forward end of the inner chamber; and a valve system to alternately control flow of the pressurized fluid from the first pressure chamber to the rearward end of the inner chamber to move the piston and drive the stunning rod forward to stun an animal, and from the second pressure chamber to the forward end of the inner chamber to move the piston and drive the stunning rod rearward and retract the stunning rod.

6. A pneumatic animal stunner for stunning an animal comprising:

a housing having a front end;

an inner chamber in the housing having a forward end and a rearward end;

a piston slideable within the inner chamber;

a stunning rod within the housing and capable of being driven by the piston forward and rearward towards and away from the front end of the housing;

a first pressure chamber adjacent the inner chamber, the first pressure chamber being in communication with the rearward end of the inner chamber, the first pressure chamber supplying a pressurized fluid rearward of the piston;

a second pressure chamber adjacent the inner chamber, the second pressure chamber being in communication with the forward end of the inner chamber, the second pressure chamber supplying a pressurized fluid forward of the piston; and a valve system to alternately control flow of the pressurized fluid front the first pressure chamber to the rearward end of the inner chamber to move the piston and drive the stunning rod forward to stun an animal, and from the second pressure chamber to the forward end of the inner chamber to move the piston and drive the stunning rod rearward and retract the stunning rod, wherein the valve system comprises a valve body with a plurality of passageways, and wherein the valve body additionally controls flow of the pressurized fluid to the first and second pressure chambers to fill the first and second pressure chambers with pressurized fluid prior to supplying the pressurized fluid rearward of the piston to move the piston and drive the stunning rod forward.

7. A pneumatic animal stunner for stunning an animal comprising:

a housing having a front end;

an inner chamber in the housing having a forward end and a rearward end;

a piston slideable within the inner chamber;

a stunning rod within the housing and capable of being driven by the piston forward and rearward towards and away from the front end of the housing;

a first pressure chamber adjacent the inner chamber, the first pressure chamber being in communication with the rearward end of the inner chamber, the first pressure chamber supplying a pressurized fluid rearward of the piston;

a second pressure chamber adjacent the inner chamber, the second pressure chamber being in communication with the forward end of the inner chamber, the second pressure chamber supplying a pressurized fluid forward of the piston;

a valve system to alternately control flow of the pressurized fluid from the first pressure chamber to the rearward end of the inner chamber to move the piston and drive the stunning rod forward to stun an animal, and from the second pressure chamber to the forward end of the inner chamber to move the piston and drive the stunning rod rearward and retract the stunning rod;

a handle having a valve trigger for the valve system; and a mount between the handle and the housing, the mount having a first portion connected to the housing, a second portion connected to the handle, and a cushion dispose between the first and second portions, the mount acting to absorb vibration and shock transmitted from the housing to the handle as the piston moves and the stunning rod is driven forward and retracted.

8. A method of stunning an animal comprising:

providing a pneumatic animal stunner having a housing with a front end, an inner chamber in the housing having a forward end and a rearward end, a piston slideable within the inner chamber, a stunning rod within the housing and capable of being driven by the piston forward and rearward towards and away from the front end of the housing, a first pressure chamber adjacent the inner chamber, the first pressure chamber being in communication with the rearward end of the inner chamber, a second pressure chamber adjacent the inner chamber, the second pressure chamber being in communication with the forward end of the inner chamber, and a valve system to alternately control flow of the pressurized fluid from the first pressure chamber to the rearward end of the inner chamber, and from the second pressure chamber to the forward end of the inner chamber;

supplying a pressurized fluid to the first pressure chamber;

supplying a pressurized fluid to the second pressure chamber in an amount less than the first pressure chamber;

supplying the pressurized fluid from the first pressure chamber to the rearward end of the inner chamber to move the piston and drive the stunning rod forward, to stun an animal; and subsequently supplying the pressurized fluid from the second pressure chamber to the forward end of the inner chamber to move the piston and drive the stunning rod rearward, and retract the stunning rod.

9. A method of stunning an animal comprising:

providing a pneumatic animal stunner having a housing with a front end, an inner chamber in the housing having a forward end and a rearward end, a piston slideable within the inner chamber, a stunning rod within the housing and capable of being driven by the piston forward and rearward towards and away from the front end of the housing, a first pressure chamber adjacent the inner chamber, the first pressure chamber being in communication with the rearward end of the inner chamber, a second pressure chamber adjacent the inner chamber, the second pressure chamber being in communication with the forward end of the inner chamber, and a valve system to alternately control flow of the pressurized fluid from the first pressure chamber to the rearward end of the inner chamber, and from the second pressure chamber to the forward end of the inner chamber;

supplying a pressurized fluid to the first pressure chamber and to the second pressure chamber simultaneously;

supplying the pressurized fluid from the first pressure chamber to the rearward end of the inner chamber to move the piston and drive the stunning rod forward, to stun an animal; and subsequently supplying the pressurized fluid from the second pressure chamber to the forward end of the inner chamber to move the piston and drive the stunning rod rearward, and retract the stunning rod.

10. A method of stunning an animal comprising:

providing a pneumatic animal stunner having a housing with a front end, an inner chamber in the housing having a forward end and a rearward end, a piston slideable within the inner chamber, a stunning rod within the housing and capable of being driven by the piston forward and rearward towards and away from the front end of the housing, a first pressure chamber adjacent the inner chamber, the first pressure chamber being in communication with the rearward end of the inner chamber, a second pressure chamber adjacent the inner chamber, the second pressure chamber being in communication with the forward end of the inner chamber, and a valve system to alternately control flow of the pressurized fluid from the first pressure chamber to the rearward end of the inner chamber, and from the second pressure chamber to the forward end of the inner chamber;

providing a valve system to alternately control flow of the pressurized fluid from the first pressure chamber to the rearward end of the inner chamber, and from the second pressure chamber to the forward end of the inner chamber;

supplying a pressurized fluid to the first pressure chamber;

supplying a pressurized fluid to the second pressure chamber;

operating the valve system to supply and control flow of the pressurized fluid from the first pressure chamber to the rearward end of the inner chamber to move the piston and drive the stunning rod forward, to stun an animal; and subsequently operating the valve system to supply and control flow of the pressurized fluid from the second pressure chamber to the forward end of the inner chamber to move the piston and drive the stunning rod rearward, and retract the stunning rod.

11. The method of claim 10 wherein the valve system additionally controls flow of the pressurized fluid to the first and second pressure chambers to fill the first and second pressure chambers with pressurized fluid simultaneously, prior to supplying the pressurized fluid rearward of the piston to move the piston and drive the stunning rod forward.

* * * * *

UNITED STATES PATENT AND TRADEMARK OFFICE
CERTIFICATE OF CORRECTION

PATENT NO.       : 9,743,678 B1
APPLICATION NO.  : 15/254546
DATED            : August 29, 2017
INVENTOR(S)      : Jones et al.

Page 1 of 1

It is certified that error appears in the above-identified patent and that said Letters Patent is hereby corrected as shown below:

In the Claims

In Claim 6, Column 18, Line 12, delete "front" and substitute therefore -- from --

Signed and Sealed this
Twenty-sixth Day of June, 2018

Andrei Iancu
*Director of the United States Patent and Trademark Office*